United States Patent [19]

Fujinami et al.

[11] 3,741,981
[45] June 26, 1973

[54] N-PHENYLSUCCINIMIDE DERIVATIVES

[75] Inventors: Akira Fujinami, Ashiya-shi; Toshiaki Ozaki, Toyonaka-shi; Katsuji Nodera, Nishinomiya-shi; Keiichiro Akiba, Takarazuka-shi; Sigeo Yamamoto, Toyonaka-shi; Katsutoshi Tanaka, Takarazuka-shi; Tadashi Ooishi, Minoo-shi, all of Japan

[73] Assignee: Sumitomo Chemical Company, Ltd., Higashi-ku, Osaka, Japan

[22] Filed: Aug. 1, 1969

[21] Appl. No.: 846,931

[30] Foreign Application Priority Data
Aug. 12, 1968 Japan.............................. 43/57498

[52] U.S. Cl.................. 260/326.5 FM, 424/274
[51] Int. Cl............................................ C07d 27/10
[58] Field of Search........................ 260/326.5 FM

[56] References Cited
UNITED STATES PATENTS
3,586,697   6/1971   Ozaki et al..................... 260/326.5
3,162,648   12/1964   Miller............................. 260/326.5

OTHER PUBLICATIONS
Allen et al. Chem. Abs., 46:3701 (1952).
Chem. Abs., 60:9157 (1964), abs. of Belg. Pat. No. 623,333.

Primary Examiner—Joseph A. Narcavage
Attorney—Stevens, Davis, Miller & Mosher

[57] ABSTRACT
Novel N-phenylsuccinimide derivatives preferable as microbicides which are represented by the formula

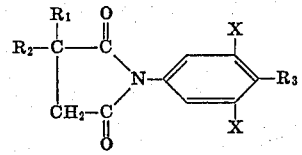

wherein $R_1$ and $R_2$ represent individually a hydrogen atom, an alkyl group having 1 to 3 carbon atoms, a benzyl group or a phenyl group, which may have been substituted by a chlorine atom; $R_3$ represents a hydrogen atom, a halogen atom or a methyl group; and X represents individually a halogen atom, provided that in case all of $R_1$, $R_2$ and $R_3$ are hydrogen atoms at the same time, X represents other halogen atoms than chlorine atoms. Examples of said derivatives are N-(3',5'-dihalogenophenyl)-3-methylsuccinimide,
N-(3',5'-dihalogenophenyl)-3,3-dimethylsuccinimide,
N-(3,4,5-trihalogenophenyl)succinimide,
N-(3,5-dihalogeno-4-methylphenyl)succinimide,
N-(3,5-dibromophenyl)succinimide,
N-(3',5'-dihalogenophenyl)-3-phenylsuccinimide,
N-(3',5'-dihalogenophenyl)-3-(halogenophenyl)succinimide,
N-(3',5'-dihalogenophenyl)-3-benzylcussinimide, and
N-(3',5'-dihalogenophenyl)-3-methyl-3-phenylsuccinimide.

These compounds are prepared by cyclizing corresponding succinic acid monoanilides under dehydration conditions.

5 Claims, No Drawings

N-PHENYLSUCCINIMIDE DERIVATIVES

This invention relates to novel N-phenylsuccinimide derivatives valuable as microbicides.

More particularly, the invention pertains to N-phenylsuccinimide derivatives represented by the formula

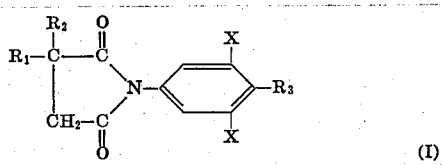

(I)

wherein $R_1$ and $R_2$ represent individually a hydrogen atom, an alkyl group having 1 to 3 carbon atoms, a benzyl group, a phenyl group or a chlorine atom — substituted phenyl group; $R_3$ represents a hydrogen atom, a halogen atom or a methyl group; and X represents a halogen atom, provided that in case $R_1$, $R_2$ and $R_3$ are hydrogen atoms at the same time, X represents other halogen atom than a chlorine atom.

Heretofore, not a few N-phenylsuccinimide derivatives have been well known. However, all the N-phenylsuccinimide derivatives provided in accordance with the present invention are novel compounds and have specifically high microbicidal activities, which can by no means be expected from other known homologues. It was found that the specific microbicidal activities of the present compounds are derived from the fact that halogen atoms have been substituted in the 3- and 5-positions of the benzene rings forming the skeletons of the present compounds. The present invention has been completed on the basis of the above-mentioned new finding.

OBJECT

It is therefore the object of the present invention to provide novel N-phenylsuccinimide derivatives, a process for the preparation thereof, and microbicidal composition containing said derivatives as active ingredients.

CHEMICAL COMPOUNDS

Among the N-phenylsuccinimide derivatives of the present invention, typical compounds having prominent fungicidal activities are enumerated below.
Compound No.

(1)

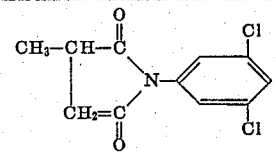

N-(3',5'-Dichlorophenyl)-3-methylsuccinimide (2)

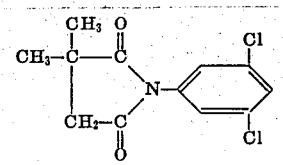

N-(3',5'-Dichlorophenyl)-3,3-dimethylsuccinimide (3)

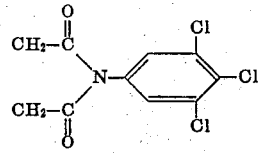

N-(3,4,5-Trichlorophenyl)succinimide (4)

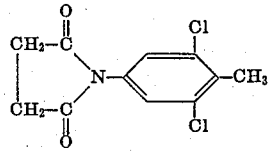

N-(3',5'-Dichloro-4'-methylphenyl)succinimide (5)

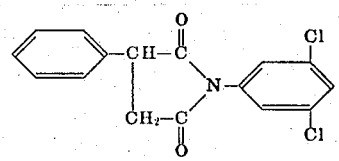

N-(3',5'-Dichlorophenyl)-3-phenylsuccinimide (6)

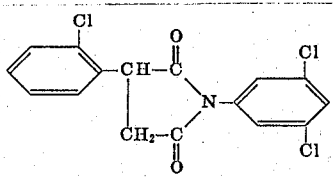

N-(3',5'-Dichlorophenyl)-3-(2''-chlorophenyl)-succinimide (7)

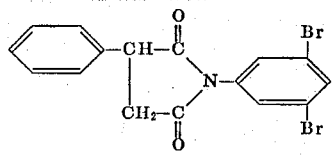

N-(3',5'-Dibromophenyl)-3-phenylsuccinimide (8)

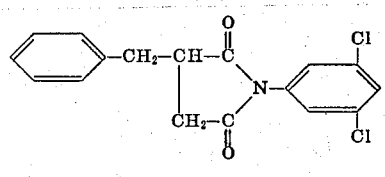

N-(3',5'-Dichlorophenyl)-3-benzylsuccinimide (9)

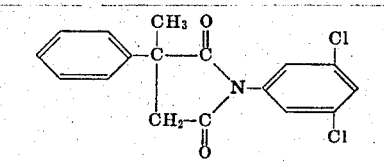

N-(3',5'-Dichlorophenyl)-3-methyl-3-phenylsuccinimide (10)

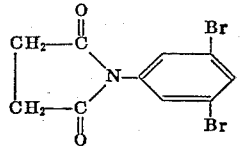

N-(3,5-Dibromophenyl)succinimide (11)

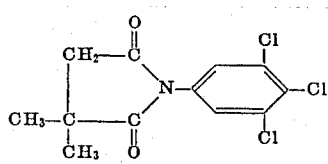

N-(3',4',5'-Trichlorophenyl)-3,3-dimethylsuccinimide

UTILITY

The compounds of the present invention have prominent effects on rice blast fungus (*Pyricularia oryzae*), rice sheath blight fungus (*Pellicularia sasakii*), rice Helminthosporium leaf spot fungus (*Cochliobolus miyabeanus*), and stem rot of kidney bean fungus (*sclerotinia sclerotiorum*), powdery mildew fungus (*Spaerotheca fuliginea*), etc. which attack agricultural and horticultural crops and hence are utilizable as plant disease-controlling agents. Further, they are effectively usable also for the control of *Aspergillus niger* which propagates in industrial products and causes serious damage. Nevertheless, they scarcely have detrimental actions on animals and plants. Fungicides having such broad antimicrobial spectra and microbicidal effects have never been seen heretofore. Accordingly, the utility of the present compounds in the industrial fields is tremendous.

PROCESS

The compounds of the present invention are prepared by subjecting to dehydration reaction to cyclize succinic acid monoanilide derivatives represented by the formula,

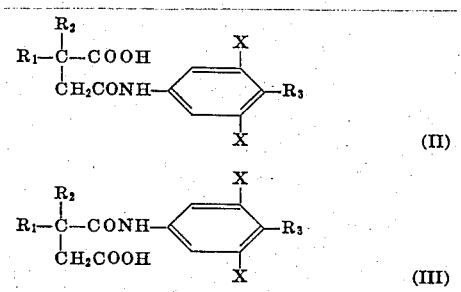

wherein $R_1$, $R_2$, $R_3$ and X are as defined previously.

STARTING COMPOUNDS

The starting compounds, i.e. succinic acid monoanilide derivatives of the formula (II) or (III), include, for example, the following compounds:

N-(3',5'-Dichlorophenyl)-2(or 3)-methylsuccinic acid monoamide.

N-(3',5'-Dichlorophenyl)-2,2(or 3,3)-dimethylsuccinic acid monoamide.

N-(3,4,5-Trichlorophenyl)-succinic acid monoamide.

N-(3',5'-Dichloro-4'-methylphenyl)-succinic acid monoamide.

N-(3',5'-Dichlorophenyl)-2(or 3)-phenylsuccinic acid monoamide.

N-(3',5'-Dichlorophenyl)-2(or 3)-(2''-chlorophenyl)-succinic acid monoamide.

N-(3',5'-Dibromophenyl)-2(or 3)-phenylsuccinic acid monoamide.

N-(3',5'-Dichlorophenyl)-2(or 3)-benzylsuccinic acid monoamide.

N-(3',5'-Dichlorophenyl)-2-methyl-2-phenylsuccinic acid monoamide.

N-(3',5'-Dichlorophenyl)-3-methyl-3-phenylsuccinic acid monoamide.

N-(3,5-Dibromophenyl)-succinic acid monoamide

N-(3',4',5'-Trichlorophenyl)-2,2(or 3,3)-dimethylsuccinic acid monoamide.

In the present process, the reaction may be effected by merely fusing the starting monoanilide derivative at an elevated temperature to obtain the desired product. The fusion temperature is adequately about 170°C. Desirably, the starting monoanilide derivative is heated under stirring at about 100°C. in the presence of a suitable dehydrating agent, e.g. acetic anhydride, acetyl chloride, phosphorus pentachloride, phosphorus oxychloride or the like, preferably acetic anhydride, whereby the desired product is easily obtained in a high yield. In this case, the reaction time is adequately about 1 hour.

FUNGICIDAL COMPOSITIONS

In actual application as fungicides, the thus obtained compounds of the present invention may be used in pure form without incorporation of other ingredients. For easier application as fungicides, however, they may be used in admixture with inert carriers and can be formulated into any of the ordinarily adopted forms such as, for example, dusts, sprays, wettable powders, oil sprays, sprays, tablets, emulsifiable concentrates, granules, etc. Further, the present compounds may be used in admixture with other chemicals such as, for example, Blasticidin-S, Kasugamycin, Polyoxin, pentachlorobenzaldoxime, γ1,2,3,4,5,6-hexachlorocyclohexane, 3,5-dichlorophenylmaleic acid imide, 3,5-dichlorophenylsuccinic acid imide, 3,5-dichlorophenylitaconic acid imide, O,O-diethyl-S-benzyl phosphorothioate, O-ethyl-SS,-diphenyl phosphorodithiolate, O-butyl-S-benzyl-S-ethyl phosphorodithiolate, O,O-dimethyl-O-(3-methyl-4-nitrophenyl) phosphorothioate, S-[1,2-bis (ethoxycarbonyl) ethyl]O,O-dimethyl phosphorodithioate, O,O-dimethyl-S-(N-methyl carbamoylmethyl) phosphorodithioate, O,O-diethyl-O-(2-isopropyl-6-methyl-4-pyrimidinyl) thiophosphate, 3,4-dimethylphenyl-N-methyl carbamate, zinc ethylene-bis-dithiocarbamate, N-trichloromethylthio-4-cyclohexene-1,2-dicarboxyimide, N-(1,1,2,2-tetrachloroethylthio)-4-cyclohexene-1,2-dicarboxyimide, iron methylarsonate, etc., and in all cases, the controling effects of individual chemicals are not deteriorated. Accordingly, it is possible to control more than one kind of diseases and injurious insects at the same time and synergistic effects would be expected depending on combinations. Furthermore, they may be used in admixture with, in addition to said chemicals, such agricultural chemicals as herbicides, nematocides and miticides and with fertilizers.

The present invention will be illustrated in further detail below with reference to examples, but it is needless to say that the examples do not limit the scope of the invention.

EXAMPLES 1-11

Preparation Process

All these examples were effected according to the following standard operational process:

A mixture comprising 0.1 mole of a succinic acid monoanilide derivative of the formula (II) or (III), 50 g. of acetic anhydride and 1.0 g. of anhydrous sodium acetate is fed to a 100 cc. four-necked flask and is stirred at 90° - 100°C. for 1 hour. Thereafter, acetic acid and acetic anhydride are removed by reduced pressure distillation, and the residue is water-washed and dried, whereby a desired product is obtained in a substantially pure form and in a high yield. When recrystallized from alcohol, the product can be brought into a pure form.

Results obtained by practicing the above-mentioned standard operational process are shown in Table 1.

TABLE 1

Resulting N-phenylsuccinimide derivative

| Example | Starting succinic acid monoanilide derivative | Structural formula and compound No. | Physical constant | Yield, percent | Calcd. C | Calcd. H | Calcd. N | Calcd. $X^1$ | Found C | Found H | Found N | Found $X^1$ |
|---|---|---|---|---|---|---|---|---|---|---|---|---|
| 1 | N-(3',5'-dichlorophenyl)-2(or 3)-methylsuccinic acid monoamide | (1) | M.P. 121°–122.5° C. | 95 | 51.19 | 3.51 | 5.43 | ²27.47 | 51.34 | 3.43 | 5.29 | ²27.34 |
| 2 | N-(3',5'-dichlorophenyl)-2,2(or 3,3)-dimethylsuccinic acid monoamide | (2) | M.P. 108°–110° C. | 94 | 52.96 | 4.07 | 5.15 | ²26.06 | 53.08 | 3.84 | 4.96 | ²25.92 |
| 3 | N-(3,4,5-trichlorophenyl) succinic acid monoamide | (3) | M.P. 186°–187.5° C. | 95 | 43.12 | 2.17 | 5.03 | ²38.19 | 43.25 | 2.07 | 4.81 | ²37.80 |
| 4 | N-(3',5'-dichloro-4'-methylphenyl)-succinic acid monoamide | (4) | M.P. 161°–162° C. | 91 | 51.18 | 3.51 | 5.43 | ²27.47 | 51.24 | 3.36 | 5.45 | ²27.66 |
| 5 | N-(3',5'-dichlorophenyl)-2(or 3)-phenylsuccinic acid monoamide | (5) | M.P. 100°–101° C. | 94 | 60.02 | 3.46 | 4.37 | ²22.15 | 60.50 | 3.28 | 4.12 | ²21.99 |
| 6 | N-(3',5'-dichlorophenyl)-2(or 3)-(2''-chlorophenyl) succinic acid monoamide | (6) | M.P. 152.5°–153.5° C. | 98 | 54.19 | 2.84 | 3.95 | ²23.99 | 54.36 | 3.00 | 3.80 | ²24.77 |

TABLE 1—Continued

| Example | Starting succinic acid monoanilide derivative | Resulting N-phenylsuccinimide derivative | | | | | | | | | |
|---|---|---|---|---|---|---|---|---|---|---|---|
| | | Structural formula and compound No. | Physical constant | Yield, percent | Elementary analysis (percent) | | | | | | |
| | | | | | Calcd. | | | | Found | | |
| | | | | | C | H | N | X[1] | C | H | N | X[1] |
| 7 | N-(3',5'-dibromophenyl)-2(or 3)-phenylsuccinic acid monoamide. | 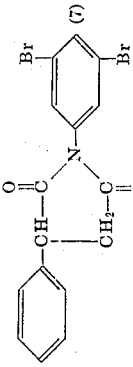 (7) | M.P. 124.5°–127.5° C. | 92 | 46.97 | 2.71 | 3.42 | [3]39.07 | 47.04 | 2.58 | 3.31 | [3]38.93 |
| 8 | N-(3',5'-dichlorophenyl)-2(or 3)-benzylsuccinic acid monoamide. | 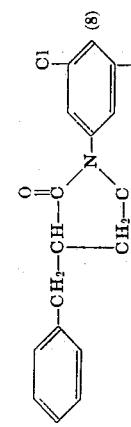 (8) | M.P. 112°–113.5° C. | 90 | 61.10 | 3.92 | 4.19 | [2]21.22 | 61.68 | 4.04 | 4.19 | [2]20.87 |
| 9 | N-(3',5'-dichlorophenyl)-2-methyl-2-phenylsuccinic acid monoamide or N-(3',5'-dichlorophenyl)-3-methyl-3-phenyl-succinic acid monoamide. | 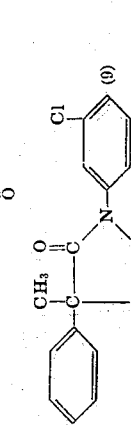 (9) | M.P. 111°–112.5° C. | 93 | 61.09 | 3.92 | 4.19 | [2]21.22 | 60.81 | 3.91 | 4.05 | [2]21.04 |
| 10 | N-(3',5'-dibromophenyl) succinic acid monoamide. | 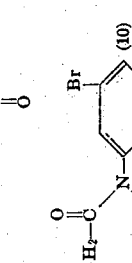 (10) | M.P. 158.5°–159.5° C. | 96 | 36.07 | 2.12 | 4.21 | [3]48.00 | 36.21 | 2.18 | 4.35 | [3]48.11 |
| 11 | N-(3',4',5'-trichlorophenyl)-2,2(or 3,3)-dimethylsuccinic acid monoamide. | 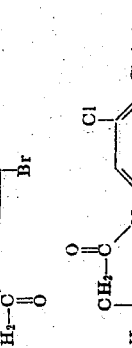 (11) | M.P. 181°–182° C. | 94 | 47.01 | 3.29 | 4.57 | [2]34.69 | 46.74 | 3.15 | 4.58 | [2]34.60 |

[1] X=Halogen.  [2] Cl.  [3] Br.

Preparation of microbicidal compositions:

The active compounds employed in the examples shown below are represented by the aforesaid compound numbers.

EXAMPLE 12 DUST

Three parts of the compound (3) and 97 parts of clay were thoroughly pulverized and mixed together to obtain a dust containing 3 percent of active ingredient. In application, the dust was dusted as it was.

EXAMPLE 13 DUST

Four parts of the compound (7) and 96 parts of talc were thoroughly pulverized and mixed together to obtain a dust containing 4 percent of active ingredient. In application, the dust was dusted as it was.

EXAMPLE 14 WETTABLE POWDER

Fifty parts of the compound (4), 5 parts of a wetting agent of alkylbenzenesulfonate type and 45 parts of diatomaceous earth were thoroughly pulverized and mixed together to obtain a wettable powder containing 50 percent of active ingredient. In application, the wettable powder was diluted with water and was sprayed.

EXAMPLE 15 EMULSIFIABLE CONCENTRATE

Ten parts of the compound (8), 60 parts of dimethylformamide, 20 parts of dioxane and 10 parts of an emulsifier of polyoxyethylene phenylphenol polymer type were mixed together to obtain an emulsifiable concentrate containing 10 percent of active ingredient. In application, the emulsifiable concentrate was diluted with water and was sprayed.

EXAMPLE 16 GRANULES

Five parts of the compound (9), 93.5 parts of clay and 1.5 parts of a binder of polyvinyl alcohol type were thoroughly pulverized and mixed together. After kneading with water, the mixture was granulated and dried to obtain a granules preparation containing 5 percent of active ingredient. In application, the granule was sprinkled as it was.

EXAMPLE 17 COMPOSITE DUST

Two parts of the compound (2), 1.5 parts of pentachlorobenzaldoxime, 1.5 parts of O-n-butyl-S-ethyl-S-benzyl phosphorodithiolate and 95 parts of clay were thoroughly pulverized and mixed together to obtain a dust containing 5 percent of active ingredients. In application, the dust was dusted as it was.

EXAMPLE 18 COMPOSITE DUST

Two parts of the compound (6), 1.5 parts of O-n-butyl-S-ethyl-S-benzyl phosphorodithiolate, 2 parts of O,O-dimethyl-O-(3-methyl-4-nitrophenyl) phosphorothioate, 1.5 parts of 3,4-dimethylphenyl-N-methyl carbamate and 93 parts of clay were thoroughly pulverized and mixed together to obtain a dust containing 7 percent of active ingredients. In application, the dust was dusted as it was.

EFFECTS

In order to substantiate excellent microbicidal effects of the present compounds, typical test results will be shown in test examples set forth below.

TEST EXAMPLE 1

Effect of controlling rice blast (Pyricularia oryzae):

Rice plants (variety: "Waseasahi"), which had been cultivated to the 3 leaves stage in flower pots of 9 cm. in diameter, were individually dusted by means of a bell jar duster with 100 mg/pot of each of test chemicals in the form of dusts. After one day, the rice plants were sprayed and inoculated with a spore suspension of rice blast fungus (Pyricularia oryzae). 5 Days thereafter, the number of diseased spots generated was counted to investigate the fungicidal effect of each test chemical, whereby the results shown in Table 2 were obtained. As seen in Table 2, the present compounds showed markedly excellent effects as compared with the control known compounds.

TABLE 2

| Compound | Active ingredient concentration (percent) | Number of spots per 10 leaves |
|---|---|---|
| (1) | 3.0 | 0 |
| (3) | 3.0 | 7 |
| (4) | 3.0 | 2 |
| (7) | 3.0 | 9 |
| (10) | 3.0 | 11 |
| 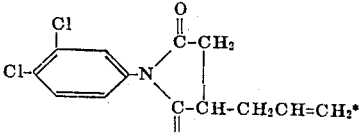 (Known compound) | 3.0 | 194 |
| 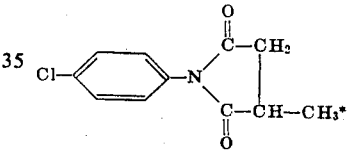 (Known compound) | 3.0 | 213 |
| 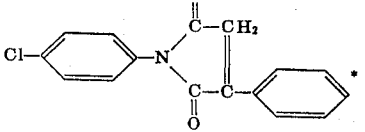 (Known compound) | 3.0 | 167 |
| Non-treatment | | 289 |

*Control.

TEST EXAMPLE 2

Effect of controlling rice Helminthosporium leaf spot (Cochliobolus miabeanus):

Rice plants (variety: "Waseasahi"), which had been cultivated to the 4 leaves stage in flower pots of 9 cm. in diameter, were individually sprayed with 10 ml./pot of an aqueous dilute solution of each of test chemicals in the form of wettable powders. After one day, the rice plants were sprayed and inoculated with a spore suspension of rice leaf spot fungus (Cochliobolus miyabeanus). Three days thereafter, the number of diseased spots generated was counted to investigate the fungicidal effect of each chemical, whereby the results shown in Table 3 were obtained. As seen in Table 3, the present compounds showed markedly excellent effects as compared with the control known compounds.

TABLE 3

| Compound | Active ingredient concentration (p.p.m.) | Number of spots per leaf |
|---|---|---|
| (1) | 100 | 0 |
| (2) | 100 | 0 |
| (5) | 100 | 4 |
| (6) | 100 | 15 |
| (7) | 100 | 8 |
| (8) | 100 | 2 |
| (9) | 100 | 3 |
| (10) | 100 | 6 |
| 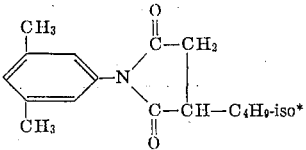 (Known compound) | 100 | 84 |
| 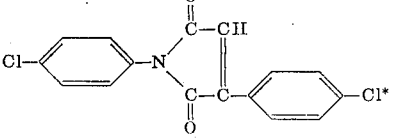 (Known compound) | 100 | 103 |
| Non-treatment | | 98 |

*Control.

TEST EXAMPLE 3

Effect of controlling rice sheath blight (*Pellicularia sasakii*):

Rice plants (variety: "Kinmaze") were cultivated in porcelain Wagner pots. When the plants had grown to a height of 50 – 60 cm., a disk inoculum of the mycelium of rice sheath blight fungus (*Pellicularia sasakii*) was inoculated on the leaf sheaths of individual stems of the plants. After one day, the plants were sprayed with 10 ml./pot of an aqueous dilute solution of each of test chemicals in the form of emulsifiable concentrates. Seven days thereafter, the size of each diseased spot generated on the leaf sheath was measured to investigate the fungicidal effect of eath test chemical, whereby the results shown in Table 4 were obtained. As seen in Table 4, the present compounds showed markedly excellent controlling effects as compared with the control known compounds.

The degree of damage set forth in the table was calculated in the following manner:

Disease index
- 0 — No spot was observed on the leaf sheaths.
- 1 — Shades similar to spots were observed on the leaf sheaths.
- 2 — Spots of less than 3 cm. in size (length) were observed on the leaf sheaths.
- 3 — Spots of more than 3 cm. in size were observed on the leaf sheaths.

$$\text{Degree of damage} = \frac{\Sigma(\text{disease index} \times \text{number of stems})}{\text{Number of investigated stems} \times 3} \times 100$$

TABLE 4

| Compound | Active ingredient concentration (p.p.m.) | Degree of damage |
|---|---|---|
| (1) | 200 | 4.2 |
| (2) | 200 | 22.7 |
| (3) | 200 | 2.9 |
| (4) | 200 | 18.6 |
| (5) | 200 | 17.4 |
| (6) | 200 | 18.8 |
| (7) | 200 | 19.3 |
| (10) | 200 | 6.2 |
| (11) | 200 | 11.7 |
| 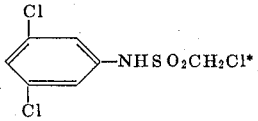 (Known compound) | 200 | 78.5 |
| 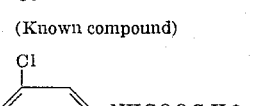 (Known compound) | 200 | 71.7 |
| 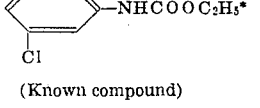 (Known compound) | 200 | 100 |
| 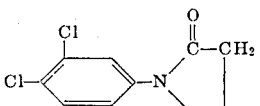 (Known compound) | 200 | 100 |
| 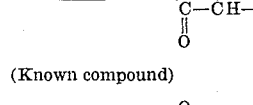 (Known compound) | 200 | 100 |
| 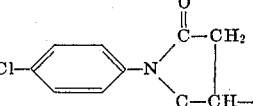 (Known compound) | 200 | 100 |
| Tuz (trade name)* | 200 | 15.5 |
| Non-treatment | | 100 |

*Control.
Tuz: An 80% wettable powder containing:

| | Percent |
|---|---|
| Monomethylarsine-bis-dimethyl dithiocarbamate | 20 |
| Zinc dimethyl dithiocarbamate | 20 |
| Tetramethylthiuram disulfide | 40 |

TEST EXAMPLE 4

Effect of controlling powdery mildew (*Sphaerotheca fuliginea*) of cucurbitaceous plants:

Pumpkin plants (variety: "Heian Kogiku") were cultivated in flower pots of 12 cm in diameter. When the plants had grown to the 3–4 leaves stage, they were individually sprayed with 7 ml./pot of each of given concentration solutions of test chemicals in the form of wettable powders. One day after, the plants were sprayed and inoculated with a spore suspension of cucurbitaceous plant powdery mildew fungus (Sphaerotheca fuliginea). Ten days thereafter, the state of disease of four leaves at the upper portion of each plant was observed and the disease degree of the plant was calculated from the area of spots generated.

In each treatment, seven pots were tested to obtain the results shown in Table 5. As seen in Table 5, the present compounds showed marked excellent controlling effects as compared with the control known compounds.

TABLE 5

| Compound | Active ingredient concentration (p.p.m.) | Degree of damage |
|---|---|---|
| (2) | 500 | 7.4 |
| (3) | 500 | 10.3 |
| (4) | 500 | 5.7 |
| (5) | 500 | 4.6 |
| (8) | 500 | 11.2 |
| (10) | 500 | 4.3 |

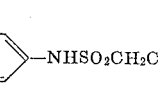

(Known compound) — 500 — 37.5

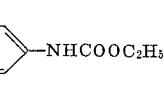

(Known compound) — 500 — 33.7

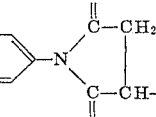

(Known compound) — 500 — 38.9

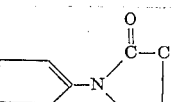

(Known compound) — 500 — 50.1

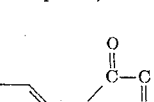

(Known compound) — 500 — 42.7

Non-treatment — 55.6

*Control.

TEST EXAMPLE 5

Antimicrobial spectra:

According to the agar medium dilution method, the growth-inhibiting effects of compounds on various plant pathogenic fungi and bacteria were investigated to obtain the results as set forth in Table 6.

TABLE 6

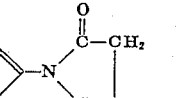

| Compound | Effective concentration (p.p.m.) | |
|---|---|---|
| | (Present compound) | (Known) (Control) |
| Test organisms | | |
| Pyricularia oryzae | 40 | 200 < |
| Cochliobolus miyabeanus | 40 | 200 < |
| Alternaria kikuchiana | 40 | 200 |
| Pellicularia sasakii | 200 | 200 < |
| Pythium aphanidermatum | 200 | 200 |
| Pellicularia filamentosa | 40 | 200 |
| Corticium rolfsii | 200 | 200 |
| Botrytis cinerea | 8 | 200 |
| Sclerotinia sclerotiorum | 8 | 200 |
| Alternaria mali | 40 | 200 < |
| Glomerella cingulata | 40 | 200 < |
| Xanthomonas oryzae | 40 | 200 < |

Note: "200 <" shows that no effect was observed at a concentration of 200 p.p.m.

According to the same method, the growth-inhibiting effects of compounds on *Aspergillus niger* propagating in industrial products were investigated to obtain the results set forth in Table 7.

TABLE 7

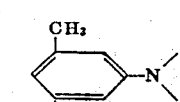

| | Effective concentration (p.p.m.) | |
|---|---|---|
| Compound | (Present compound) | (Known) (Control) |
| Test organism: | | |
| *Aspergillus niger* | 40 | 1,000< |

NOTE.—"1,000<" shows that no effect was observed at a concentration of 1,000 p.p.m.

What is claimed is:

1. An N-phenylsuccinimide derivative represented by the formula,

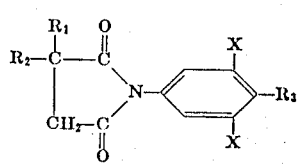

wherein $R_1$ and $R_2$ represent individually a hydrogen atom, an alkyl group having 1 to 3 carbon atoms, a benzyl group, a phenyl group or a chlorine atom - substituted phenyl group; $R_3$ represents a hydrogen atom, a halogen atom or a methyl group; and X represents a halogen atom, provided that in case $R_1$, $R_2$ and $R_3$ are hydrogen atoms at the same time, X represents other halogen atom than a chlorine atom.

2. N-(3',5'-Dichlorophenyl)-3-methylsuccinimide 17 18
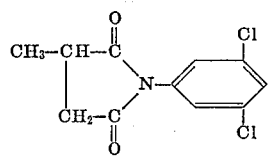
3. N-(3',5'-Dichlorophenyl)-3,3-dimethylsuccinimide
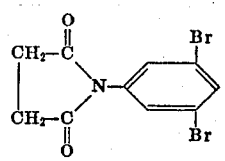
5. N-(3,4,5-Trichlorophenyl)succinimide
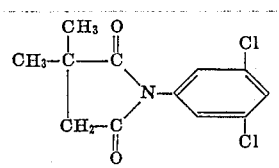
4. N-(3,5-Dibromophenyl)succinimide
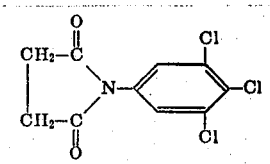
* * * * *